(12) United States Patent
Sueyoshi

(10) Patent No.: US 6,889,378 B2
(45) Date of Patent: May 3, 2005

(54) INFORMATION PROCESSING METHOD, INTER-TASK COMMUNICATION METHOD, AND COMPUTER-EXECUTABLE PROGRAM FOR THE SAME

(75) Inventor: Masahiro Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 582 days.

(21) Appl. No.: 09/911,235

(22) Filed: Jul. 23, 2001

(65) Prior Publication Data

US 2002/0065866 A1 May 30, 2002

(30) Foreign Application Priority Data

| Jul. 24, 2000 | (JP) | ......................................... | 2000-222896 |
| Aug. 3, 2000 | (JP) | ......................................... | 2000-235605 |

(51) Int. Cl.[7] ........................................... G06F 15/163
(52) U.S. Cl. ...................................... 719/310; 713/200
(58) Field of Search .......................... 719/310; 713/200

(56) References Cited

U.S. PATENT DOCUMENTS 5,764,889 A * 6/1998 Ault et al. ................... 713/200
6,449,720 B1 * 9/2002 Sprague et al. ............. 713/171

FOREIGN PATENT DOCUMENTS

| EP | 0 308 219 | 3/1989 |
| EP | 0 505 706 | 9/1992 |
| EP | 0 704 796 | 4/1996 |

* cited by examiner

*Primary Examiner*—Meng-Al T. An
*Assistant Examiner*—Lechi Truong
(74) *Attorney, Agent, or Firm*—Frommer Lawrence & Haug LLP; William S. Frommer

(57) ABSTRACT

An information processing method has a mechanism wherein mutual verification is performed between tasks and a computer operating system at the time of activating tasks, thereby judging the validity of tasks. The operating system evaluates a key which the task holds at the time of requesting service of the operating system, and permits execution of services only in the event that the operating system itself has the same key.

A mail transmitting task specifies a mail ID and address to a mail body, management information is written by the operating system to a secure memory queue list based on the security level of the mail transmitting task and the security level of a transmitting function, and contents wherein mail transmission contents are enciphered with the mail ID, address value of management information, and address value of the mail body, as a key, are written to a buffer. The operating system deciphers the contents of the buffer wherein the received contents exist, with the mail ID, address value of management information, and address value of the mail body, as a key, based on the security level of the mail receiving task and the security level of a receiving function, and copies this onto a buffer on the mail receiving task.

11 Claims, 11 Drawing Sheets

SET SECURITY LEVEL FOR EACH BLOCK

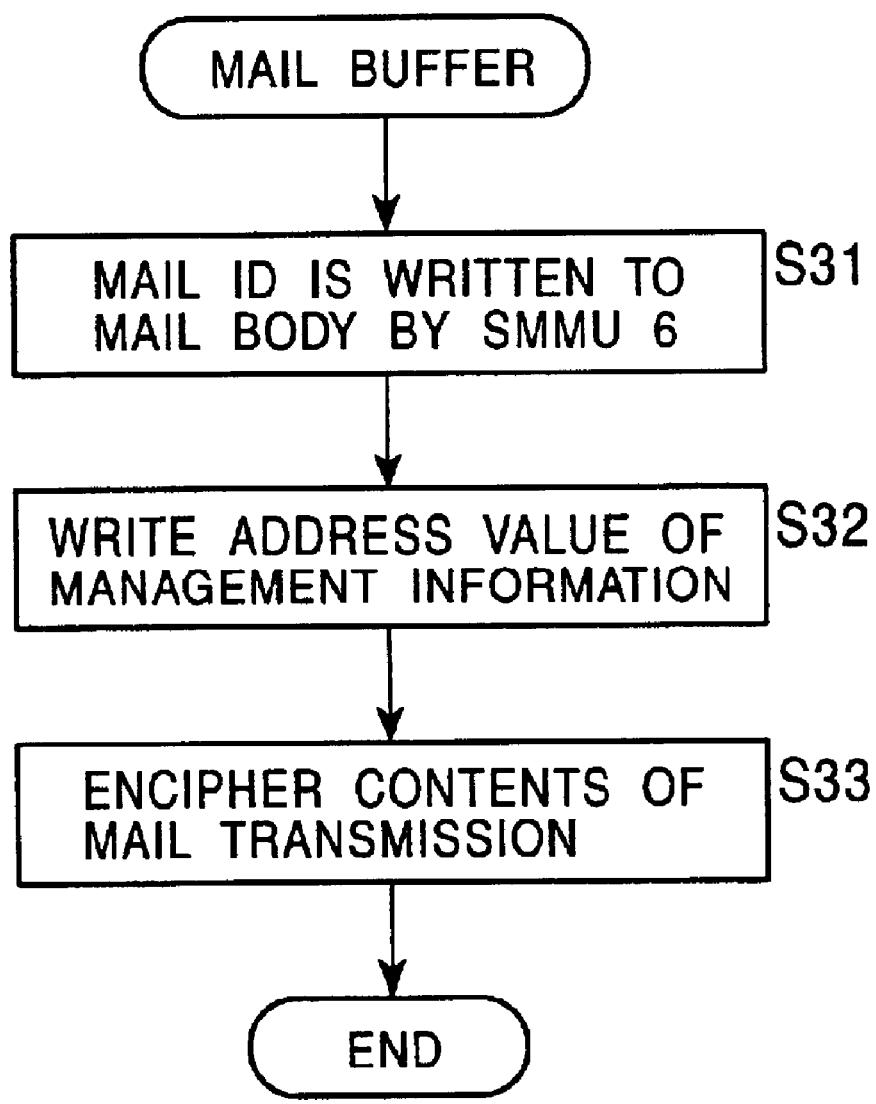

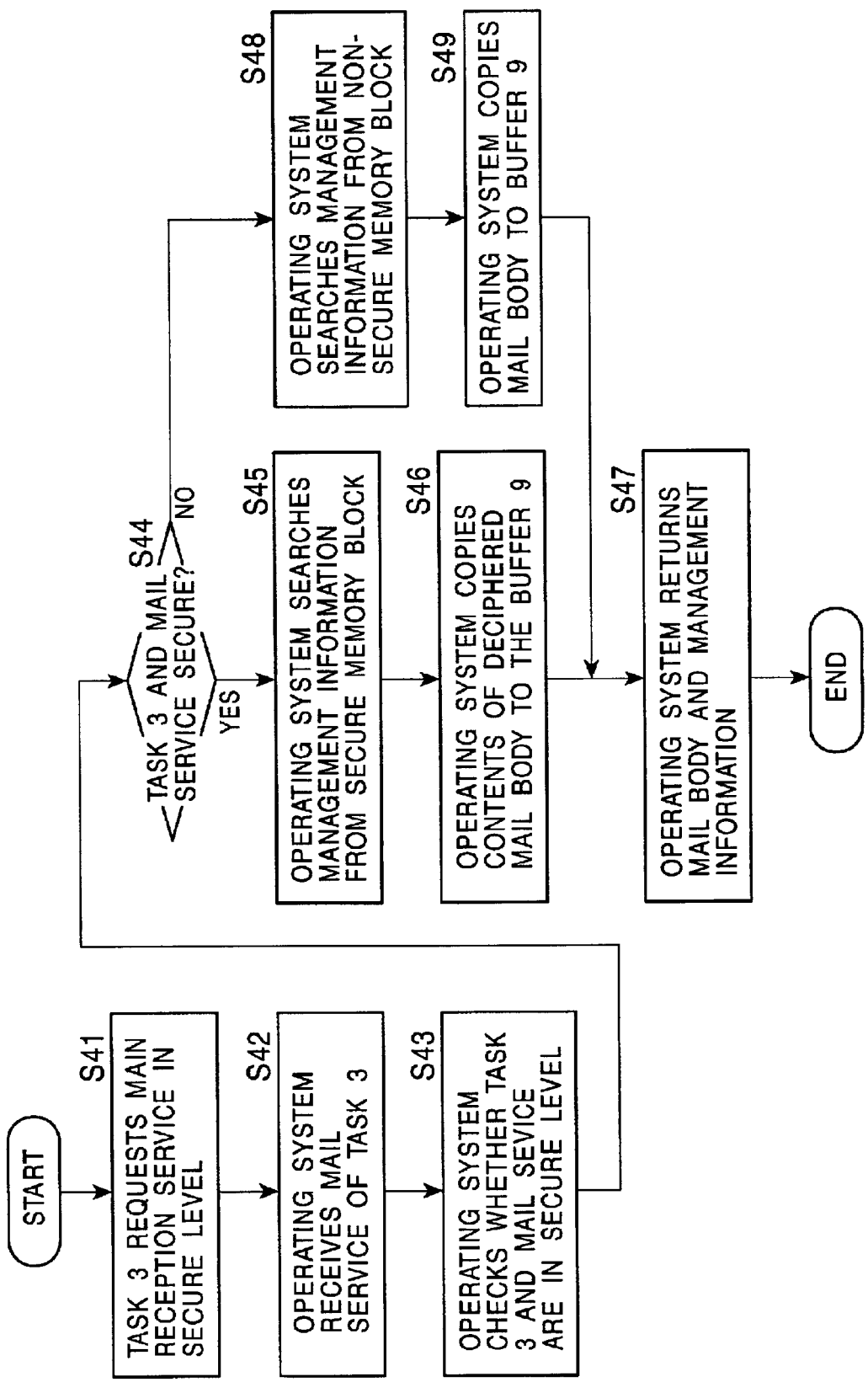

FIG. 12A

MAIL TRANSMISSION

SendMail(int MailBoxNumber, MailBuf *buf, int SecurityLevel)

FIG. 12B

MAIL RECEPTION

RecvMail(int MailBoxNumber, MailBuf *buf, int SecurityLevel)

INFORMATION PROCESSING METHOD, INTER-TASK COMMUNICATION METHOD, AND COMPUTER-EXECUTABLE PROGRAM FOR THE SAME

BACKGROUND OF THE INVENTION

The present invention relates to an information processing method, a secure inter-task communication method on an operating system, and a computer-executable program for the same.

More specifically, the present invention relates to an information processing method wherein a processor executes tasks using memory or other such hardware resources, particularly having a configuration wherein one or more tasks operate under an environment provided by an operating system, and wherein, in a configuration with an operating system and multi-tasks existing on the operating system, the operating system securely executes application programs described in the task portions; and to a secure inter-task communication method on an operating system, wherein, in the configuration of an operating system and tasks executed on the operating system, the security level of tasks themselves and whether or not there is a security mode specified at the time of transmitting and receiving on the task side are judged at the operating system side, and in the event that there is security, a communication work area is obtained from a memory area regarding which access thereto is restricted, and the contents of transmission are enciphered; and further to a computer-executable program for realizing the above methods on a computer.

Recently, computing technology such as information processing and information communication has improved greatly, and computer systems have come to be commonplace. Computer systems generally execute various types of computation processing under the control of an operating system.

With recent operating systems, a mechanism capable of switching between and processing multiple programs such that several jobs can be worked on in parallel, i.e., "multitasking", is becoming common. Operating systems multiplex hardware resources, which are actually finite, in a virtual manner, and efficiently appropriate the hardware resources to the requests of each of the programs.

For example, Japanese Unexamined Patent Application Publication No. 2000-48483 discloses an information processing method which allows mutual verification between a reproducing device and a data processing device, enabling a multi-tasking configuration for each of the contents being reproduced on the reproducing device. That is to say, the reproducing device reads out data stored in a storing medium with an identification ID from the data processing device according to requests from the data processing device, and performs a plurality of enciphering and verification jobs by temporarily storing an intermediate key INT KEY in a selective and time-divided manner, and also performs time-division sending. Also, the data processing device deals with multiple sets of data requested by the time-division processing in a selective and time-divided manner by temporarily storing parameters for a plurality of deciphering and verification jobs by identifiers returned from the reproducing device, and performs enciphering and verification tasks corresponding to the plurality of sets of time-division processing.

However, the information processing method described in this Publication only performs mutual verification between the devices, and mutual verification is not performed in the case of requesting a service at the time of activating a task or from a task to the operating system.

In the event that the kernel portion and the task are provided independently, or in the event that a part of the tasks have been created by a third party, there is no way to know whether the task is reliable and valid.

That is to say, there are cases wherein application programs described in the task portion cannot be executed securely as viewed from the operating system.

Also, with normal arrangements for inter-task communication on operating systems, there has been no memory provided for hiding or concealing the contents of data being exchanged, so the contents can be read out and written to by software modules created by a third party.

A mechanism capable of realizing inter-task communication (e.g., mail) according to whether or not security has been set by the transmitting side task has been invented to deal with this, in order to realize secrecy of data being sent via the operating system.

For example, Japanese Unexamined Patent Application Publication No. 08-106441 describes an inter-process communication method having a security level based upon the assumption of a micro-architecture type operating system.

However, this Publication also has a problem in that a trusted server, equivalent to a verification office, is necessary outside the operating system.

SUMMARY OF THE INVENTION

The present invention has been made in light of the above problems, and accordingly, it is an object of the present invention to provide an information processing method having a configuration for one or more tasks to operate under an environment provided by the operating system.

It is another object of the present invention to provide an information processing method wherein, in a configuration with an operating system and multi-tasks existing on the operating system, the operating system securely executes application programs described in the task portions.

It is a further object of the present invention to provide a secure inter-task communication method on an operating system, realizing access restrictions and enciphering of transmission contents by the operating system itself with hardware for the transmission contents body instead of having a verification office outside of the operating system, thereby giving consideration to assembly usage, enabling increased secrecy for inter-task communications having security by providing a security level to task which perform key operation, encryption, and deciphering under an environment wherein processing of tasks according to security level exist together, further enabling the security level to be individually set for tasks and for at the time of activating inter-task communication services, and enabling access restrictions to the content body of inter-task communications by the combination of both.

To this end, according to a first aspect of the present invention, an information processing method whereby one or more tasks are executed under an executing environment provided by an operating system, comprises a step for executing mutual verification between the operating system and a task at the time of activating the task.

Here, the mutual verification step may be performed using a key given by a user describing a task.

According to a second aspect of the present invention, an information processing method whereby one or more tasks are executed under an executing environment provided by an operating system, comprises: a step for executing mutual verification between the operating system and a task at the time of the task requesting service of the operating system.

Here, the mutual verification step may be performed by using data created by enciphering predetermined data with key information used for a first mutual verification as an execution key for a second mutual verification, and the second mutual verification may be performed following the first mutual verification.

According to a third aspect of the present invention, an information processing method whereby one or more tasks are executed under an executing environment provided by an operating system, comprises: a step for the operating system to verify a task based on a mutual verification key held by the task; a step for the operating system to encipher the stack pointer of the task with the mutual verification key, and return it to the task; and a step for the task to decipher the stack pointer enciphered with the mutual verification key and perform verification.

Here, in the event that the verification is successful, the operating system and task may hold the stack pointer enciphered with the mutual verification key as an executing key to be used for subsequent verification steps.

According to a fourth aspect of the present invention, an information processing method whereby one or more tasks are executed under an executing environment provided by an operating system, comprises: a step for a task to request service of the operating system, with an executing key attached; a step for the operating system to verify the task based on the executing key; and a step for the operating system, in response to success of the verification, to execute services commissioned, and to encipher the stack pointer of the task with the executing key to generate a next executing key.

According to a fifth aspect of the present invention, a program for a computer to execute information processing whereby one or more tasks are executed under an executing environment provided by an operating system, comprises: a step for the operating system to verify a task based on a mutual verification key held by the task; a step for the operating system to encipher the stack pointer of the task with mutual verification key, and return it to the task; and a step for the task to compound and verify the stack pointer enciphered with the mutual verification key; wherein, in the event that the verification procedures are successful, the operating system and task hold the stack pointer enciphered with the mutual verification key as an executing key to be used for subsequent verification steps.

According to a sixth aspect of the present invention, a program for a computer to execute information processing whereby one or more tasks are executed under an executing environment provided by an operating system, comprises: a step for a task to request service of the operating system, with a first executing key attached; a step for the operating system to verify the task based on the first executing key; and a step for the operating system, in response to success of the verification, to execute services requested, and to encipher the stack pointer of the task with the executing key to generate a second executing key to be used next time.

According to a seventh aspect of the present invention, a communication method between tasks executed on an operating system, comprises: a step for managing the security level of tasks themselves and mutual verification keys for mutual verification between tasks and the operating system, in a table format at the operating system side, wherein the security level has a first level which is secure and a second level which is not secure; a step for reading and writing blocks of tasks of the first level and blocks of tasks of the second level separately into a secure memory block and a non-secure memory block, respectively; a step for providing a first buffer on a first task of a task of the first level, and a second buffer on a second task of a task of the second level, and providing within the operating system memory area for storing data and memory area for storing management information; a step for specifying at the first task an ID and an address appropriated at the first task side, judging at the operating system side which memory block to use based on the security level of the first task and the security level of a first function, and, in the event that the security level of the first task and the level for executing the first task are secure, management information is written to the security memory block and data is written as enciphered contents with the ID, address value of management information, and address value of the data body, as a key; and a step for specifying at the second task an ID the same as the second task and an address appropriated at the second task side, judging at the operating system side which secure memory block to use based on the security level of the second task and the security level of a second function, and, in the event that the security level of the second task and the level for executing the second level are secure, data addressed to the second task managed in the secure memory block is searched, and the contents of the buffer where the data exists is copied onto the second task having been deciphered with the ID, address value of management information, and address value of the data body, as a key.

The task here may be any of a semaphore, event flag, or mailbox. The task may be a semaphore, the first task may be returning of resources, and the second task may be standing by to capture resources. Or, the task may be an event flag, the first task may be setting an event flag, and the second task may be clearing an event flag. Further, the task may be a mailbox, the first task may be transmitting data, and the second task may be receiving data.

Verification may be performed by collating whether or not a key each task has is the same as the key managed at the operating system side.

This method may be carried out by memory managing means which performs reading and writing discriminatorily between the secure memory block and the non-secure memory block, the memory managing means may comprise hardware capable of setting access permission for each block of the memory blocks according to security level, and the memory managing means may be set so as to not be capable of reading from or writing to the memory block of a first level with regard to a first task or a second task in the second level.

The operating system may perform management of security levels for each task and management of the memory blocks via the memory managing means in a centralized manner. Also, the management information may comprise mail size and a mail body pointer.

Due to such a configuration, in the event that the secure operating system side judges that the mail transmitting task and the security level of the mail receiving task itself are set to a security mode specified by the task side at the time of transmitting and receiving, the operating system appropriates to a secure memory block the actual state of the data to be transmitted and management data for establishing inter-task communication paths, enciphers data to be transmitted at the secure operating system side using a key, and deciphers data of a mail reception task.

Also, the security level can be individually set at the time of activating tasks and inter-task communication services.

Further objects, characteristics, and advantages of the present invention will become more apparent from the more detailed description based on the later-described embodiments of the present invention and attached drawings.

BRIEF DESCRIPTION OF THE DRAWINGS

FIG. 10 is a flowchart illustrating the flow of enciphering the mail body, applied to the embodiment of the secure inter-task communication method on an operating system according to the present invention;

FIG. 11 is a flowchart illustrating the flow of mail receiving processing, applied to the embodiment of the secure inter-task communication method on an operating system according to the present invention;

FIG. 12A is a figure illustrating an example of mail transmission functions, applied to the first embodiment of the secure inter-task communication method on an operating system according to the present invention; and FIG. 12B is a figure illustrating an example of mail reception functions.

DESCRIPTION OF THE PREFERRED EMBODIMENTS

First, a general description will be given regarding the operation of the embodiments.

The information processing method involves an operating system and tasks executed on the operating system, and has a mechanism wherein mutual verification is performed between tasks and the operating system at the time of activating tasks, thereby judging the validity of tasks.

For example, verification and authentication can be performed at the point that a task created by a third party is activated or at the point that the task requests a service of the operating system.

Also, the operating system evaluates a key which the task holds at the time of the task requesting service of the operating system, and permits execution of services only in the event that the operating system itself has the same key, thereby enabling security to be maintained.

According to the present invention, the operating system uses the data obtained by enciphering the stack pointer for each task with a key as the next key (ID). Accordingly, the key for the task to request services from the operating system is updated each time so long as there is movement of the stack pointer, so security is maintained.

Concluding from the above, with the information processing method according to the present invention, application programs described in the task portion can be securely executed as viewed from the operating system.

The following is a detailed description of embodiments of the present invention, with reference to the drawings.

First Embodiment

In the realizing of the present invention, let us assume that a user describing applications as tasks (hereafter referred to simply as "user") provides mutual verification keys for each task No. (or task ID), as shown in the following table.

TABLE 1

| Task ID | Task initial key |
|---------|------------------|
| 1       | X1, X2, ..., X8  |
| 2       | Y1, Y2, ..., Y8  |
| .       | .                |
| .       | .                |
| .       | .                |

On the other hand, the operating system internally holds the table for managing task IDs and keys in a state that the user cannot read or write.

Figure 1:
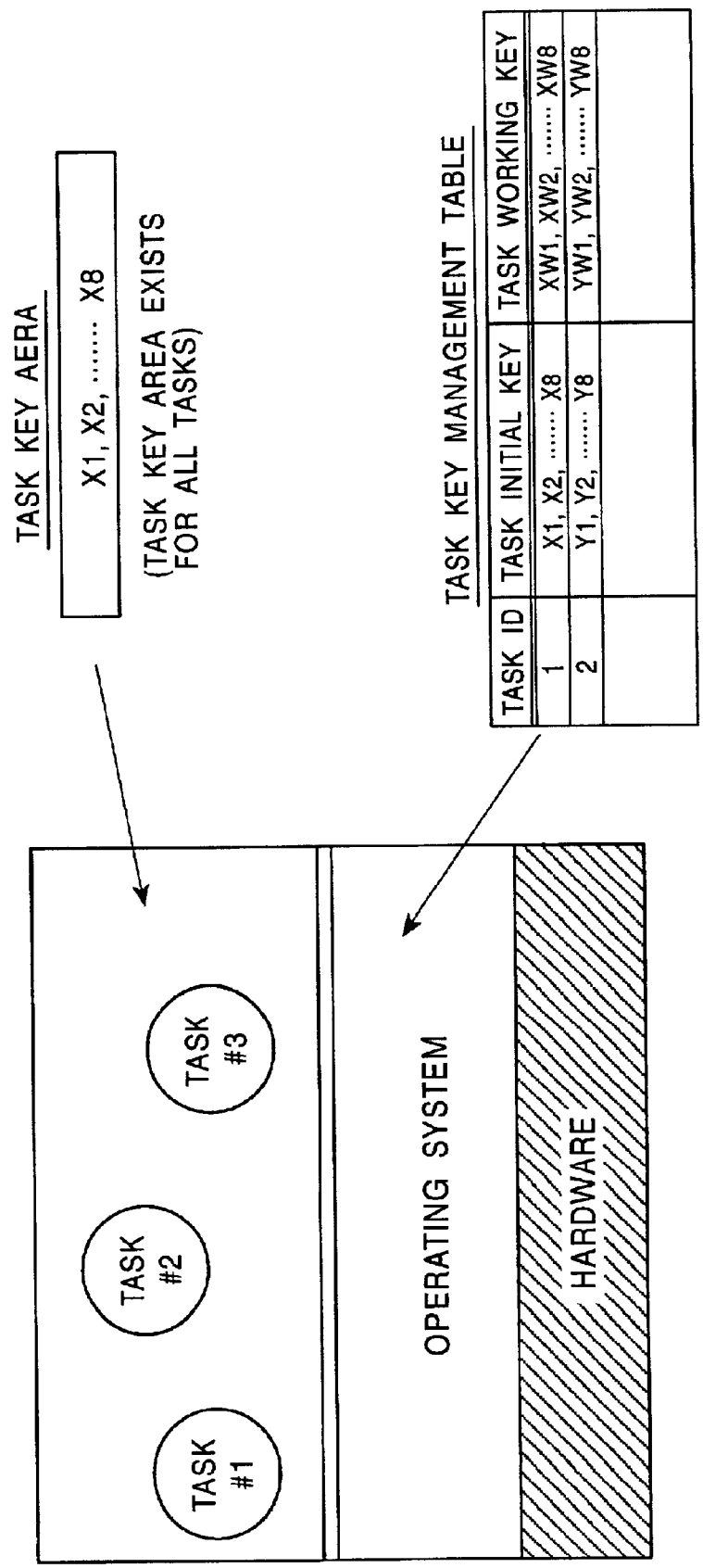
FIG. 1 is a diagram schematically illustrating the configuration of a key managing table and the area where the table is stored.

FIG. 1 schematically illustrates the configuration of the key managing table and the area where the table is stored.

In the key managing table for the tasks, a mutual verification key (task initial key) and executing key (task working key) are set for each task ID.

Also, the user provides a key storing area for each task, and a function "GetCurrentSP( )" for telling the current stack pointer.

Figure 2:
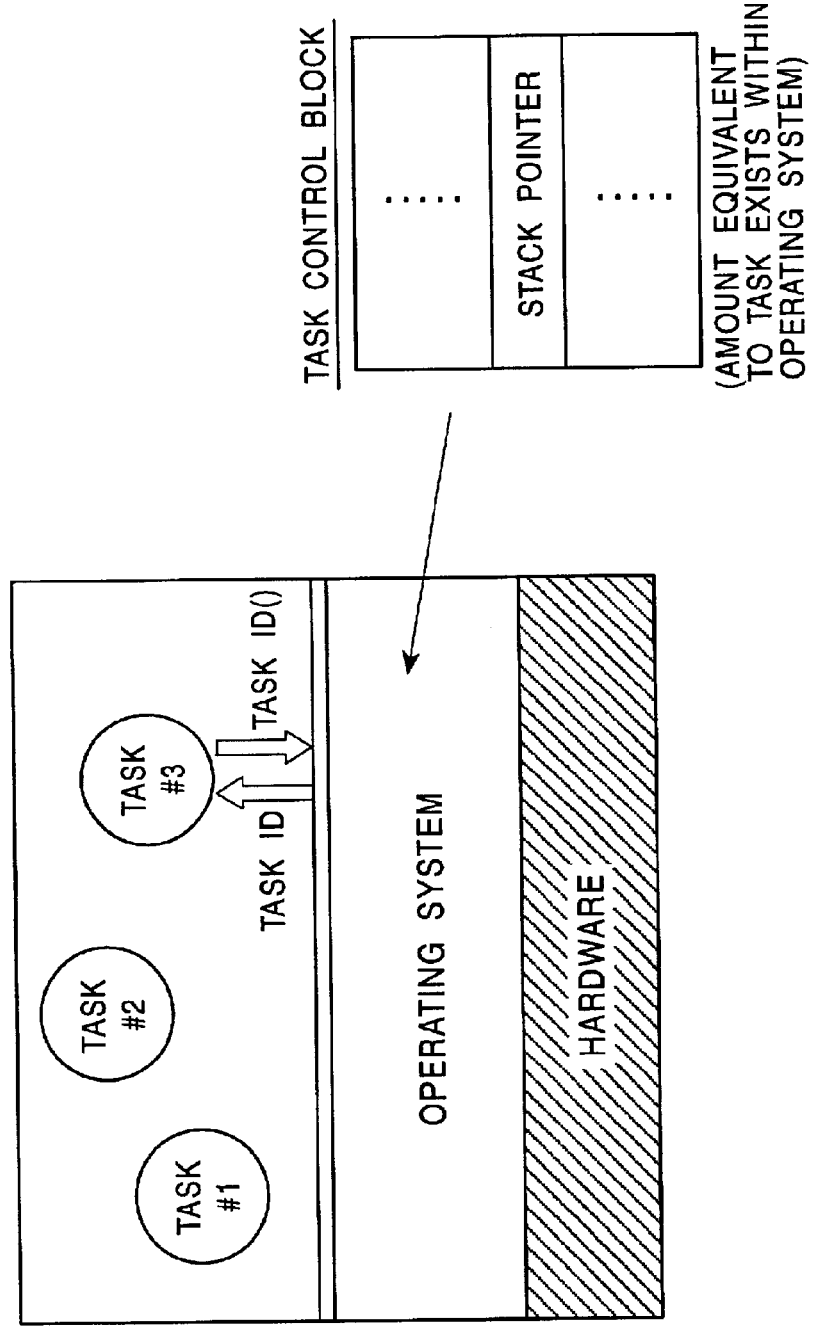
FIG. 2 is a diagram for describing functions and task control block.

FIG. 2 schematically illustrates the operation of the function and task control block.

Task control blocks (TCB) equivalent to the number of tasks are provided at the operating system. A stack pointer or when the operating system last received a service is stored in the task control block. Also, the operating system has a function "TaskID( )" for returning a task ID.

In order for a task to obtain a task ID, a service request "TaskID( )" to the operating system can be used. Also, in order to obtain the stack pointer at the task, the function "GetCurrentSP( )" provided by the user can be used.

At the time of task switching accompanying activation of the scheduler of the operating system, the stack pointer at the point that the task was being executed is saved in a predetermined field in the task control block each time.

Figure 7:
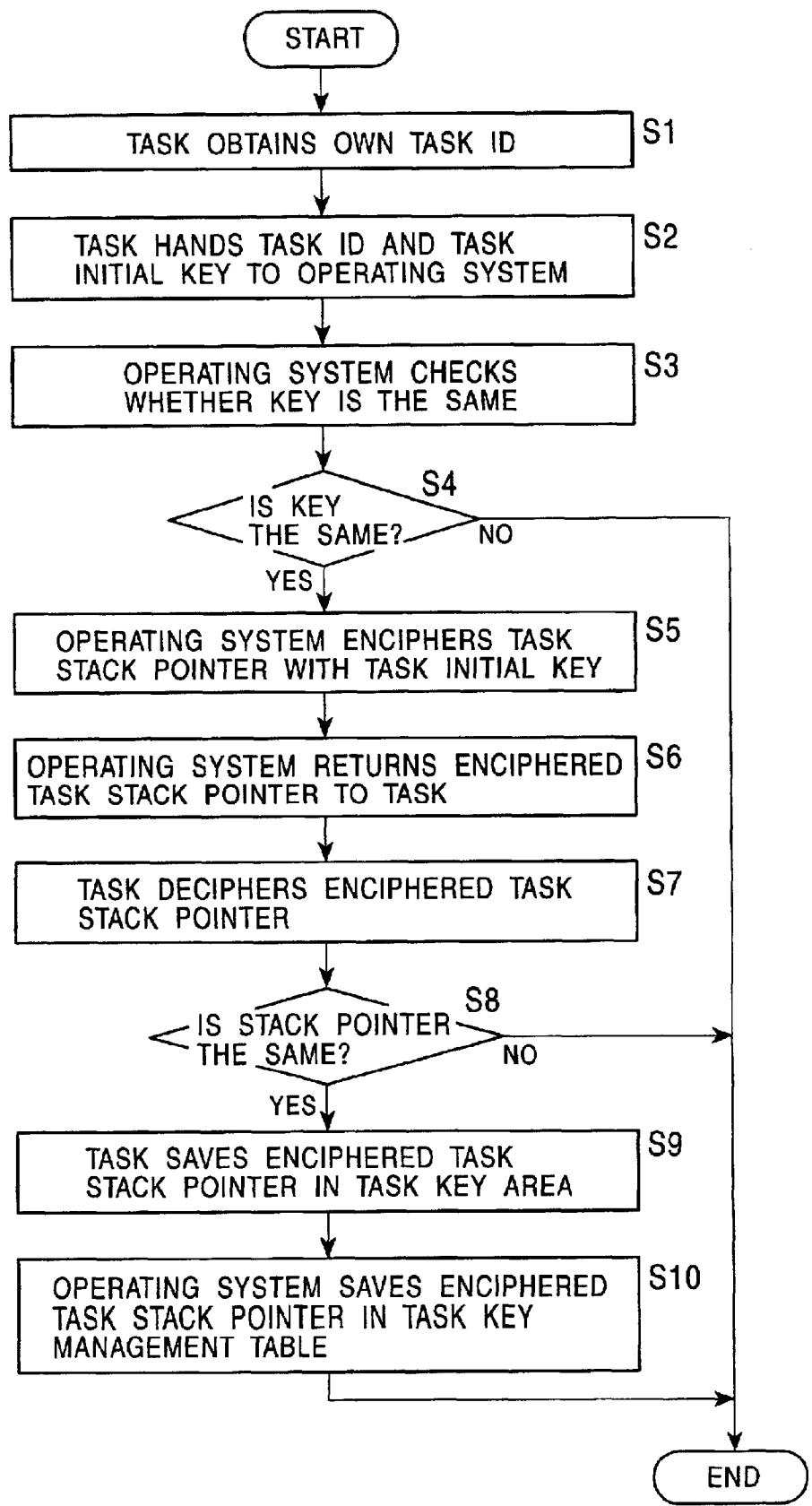
FIG. 7 is a flowchart illustrating the procedures for processing wherein the task and operating system perform mutual verification.

Next, the procedures for processing wherein the task and operating system perform mutual verification will be described with reference to the flowchart shown in FIG. 7.

First, the task obtains its own task ID from the operating system, using the function "TaskID( )" (step S1). Then, the task hands the task ID and mutual verification key, i.e., the task initial key, to the operating system (step S2). Handing over of the task ID and verification key is performed by "supervisor call", for example.

The operating system compares the received task initial key and the task initial key which is managed at the task key managing table (steps S3 and S4). In the event that the two do not agree, verification fails, and this entire verification processing routine ends.

On the other hand, in the event that the keys match, it is viewed that verification at the operating system has succeeded. In this case, the operating system enciphers the stack pointer of the task with the task initial key (step S5) and returns the enciphered data "$Enc_{TIKey}$(TaskSP)" to the task (step S6).

The task deciphers the received enciphered data with its own task initial key (step S7), and also compares this with the value of the stack pointer obtained suing the function "GetCurrentSP( )" (step S8). In the event that the two do not agree, verification fails, and this entire verification processing routine ends.

On the other hand, in the event that both sets of data agree, it is viewed that verification at the task has succeeded, and the enciphered data "$Enc_{TIKey}$(TaskSP)" is saved in the task key area (step S9).

Further, the operating system also holds data obtained by enciphering, with the task initial key, data obtained by enciphering the stack pointer within the task control block, as a task working key within the executing key area in the task key managing table (step S10).

Figure 8:
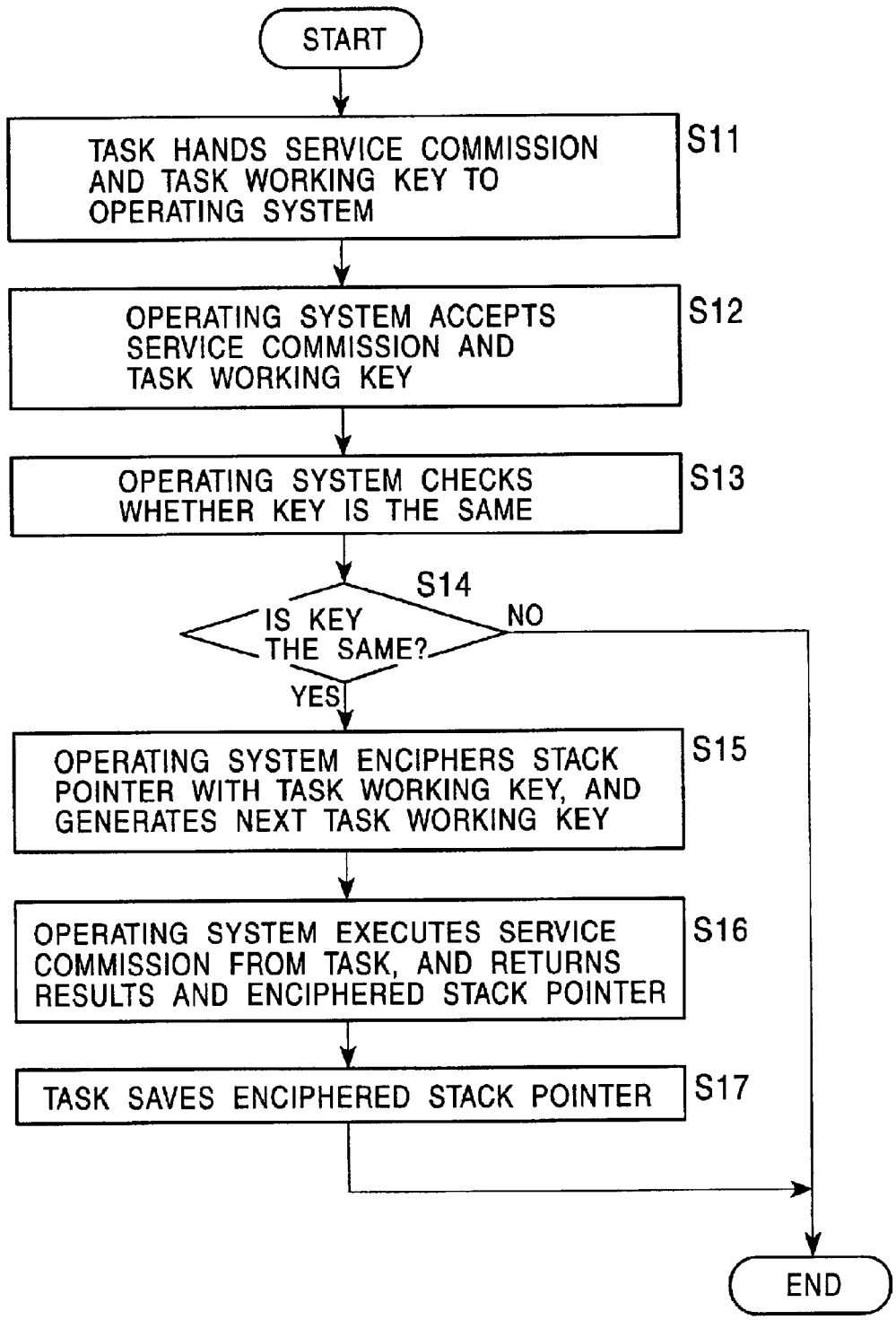
FIG. 8 is a flowchart illustrating the procedures for performing verification processing at the time of service verification.

Next, description will be made regarding the flow of verification processing at the time of executing tasks, with reference to FIG. 8.

The task hands the service commission to the operating system, along with the contents of the task key area, i.e., the task working key (step S11). This service commissioning is functions provided by the operating system, such as requests to peripheral equipment, managing a memory pool, managing time, transmitting and receiving messages to and from other tasks, and so forth. Also, service commissions are performed by, for example, supervisor call.

In response, the operating system receives the supervisor call and the task working key (step S12), and makes comparison with that of the corresponding task ID held in the key management table (steps S13 and S14). In the event that the two do not agree, verification fails, and this entire verification processing routine ends.

On the other hand, in the event that the keys agree, the operating system judges that the task requiring the service as authorization to execute.

In this case, the operating system generates data obtained by enciphering the stack pointer of the task with the task working key as the next task working key (step S15), and writings this to the corresponding task working key field in the task key management table.

Then, the operating system executes the commissioned service, and returns this as the next task working key to the task along with the results of execution (step S16).

The task stores completion of the service and the received task working key in the task key area, and prepares for subsequent execution.

As described above in detail, according to the present invention, an information processing method having a configuration for one or more tasks to operate under an environment provided by the operating system is provided.

Also, according to the present invention, an information processing method is provided wherein, in a configuration with an operating system and multi-tasks existing on the operating system, the operating system securely executes application programs described in the task portions.

The information processing method according to the present invention of an operating system and tasks executed on the operating system has a mechanism wherein mutual verification is performed between tasks and the operating system at the time of activating tasks, thereby judging the validity of tasks. For example, verification and authentication can be performed at the point that a task created by a third party is activated or at the point that the task requests a service of the operating system.

Also, the operating system evaluates a key which the task holds at the time of the task requesting service of the operating system, and permits execution of services only in the event that the operating system itself has the same key, thereby enabling security to be maintained.

According to the present embodiment, the operating system uses the data obtained by enciphering the stack pointer for each task with a key as the next key (ID). Accordingly, the key for the task to request services from the operating system is updated each time so long as there is movement of the stack pointer, so security is maintained.

Accordingly, application programs described in the task portion can be securely executed as viewed from the operating system.

Second Embodiment

Next, an embodiment of the secure inter-task communication method on an operating system will be described with reference to the drawings.

Before describing this embodiment in detail, first, the general characteristics thereof will be described. The present embodiment realizes configuration of an operating system and tasks executed on the operating system, the security level of tasks themselves and whether or not there is a security mode specified at the time of transmitting and receiving on the task side are judged at the operating system, thereby realizing inter-task communication paths with different security levels.

Also, in the event that judgment is made that there is a security mode, the operating system appropriates the actual state of the data to be transmitted and management data for establishing an inter-task communication path to memory with restricted access.

On the other hand, in the event that judgment is made that there is no security mode, both data are appropriated to general memory with no access restrictions.

Further, in the event that judgment is made at the task that there is a security mode, the operating system enciphers the actual state of the data to be transmitted with a key.

Examples of inter-task communication include semaphores used for exclusive control of resources, event flags for notifying another party of whether or not an event exists, mailboxes used for handing over relatively large amounts of data between tasks, and so forth. Understanding this to be so, generating and deleting of tasks means returning and capturing resources, setting and clearing event flags, and transmitting and receiving messages, respectively.

Next, a second embodiment with such characteristics will be described in detail. The description will start with reference to FIG. 4.

Figure 4:
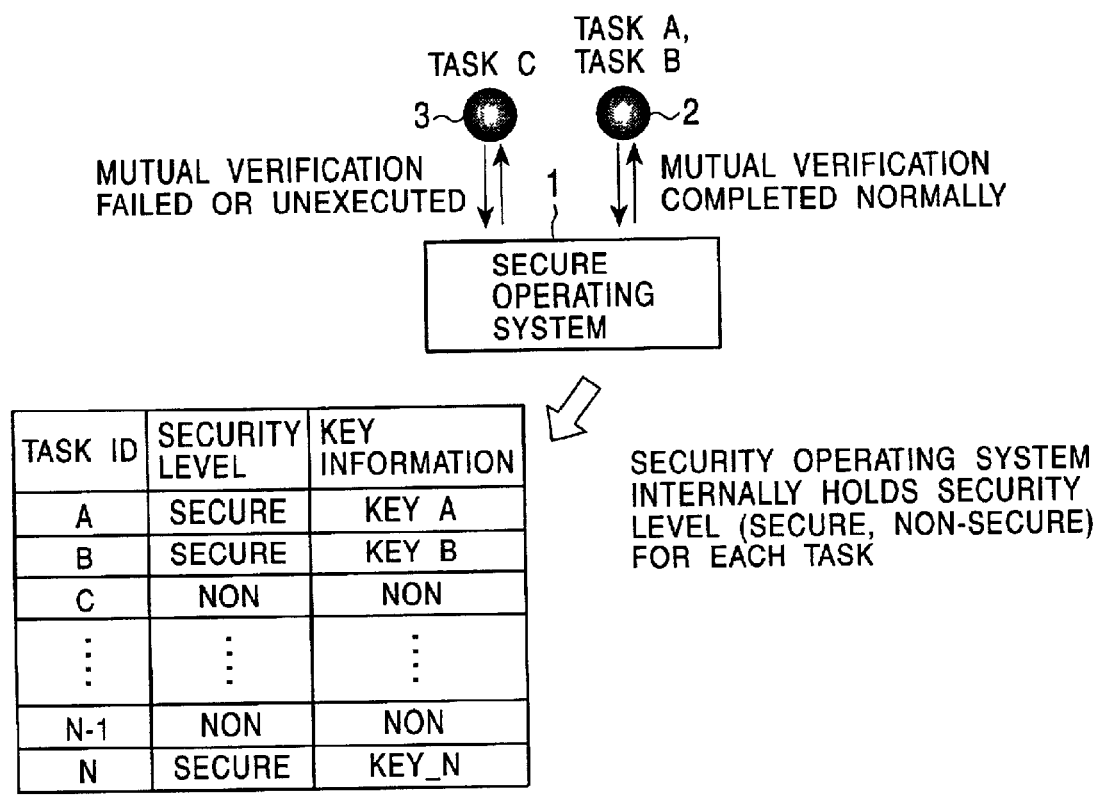
FIG. 4 is an explanatory diagram for describing the task security level on a secure operating system, applied to the embodiment of the secure inter-task communication method on an operating system according to the present invention.

FIG. 4 is an explanatory diagram for describing the security level of tasks 2 and 3 on a secure operating system 1 to which the present embodiment is applied.

This second embodiment assumes two levels, secure and non-secure.

The tasks 2 and 3 (in FIG. 4, task 2 consists of task A and task B) regarding which mutual verification between the secure operating system 1 and the tasks has succeeded are in a secure level, and the task 3 (which is task C in FIG. 2) regarding which mutual verification has not been performed, has failed, or has not been processed, is in a non-secure level.

An example of the mutual verification method between the secure operating system 1 and the tasks 2 and 3 involves the tasks 2 and 3 each having keys, and the level is secure in the event that the keys which the tasks 2 and 3 have match the keys which the secure operating system 1 is managing, but the level is non-secure in the event that the keys of both parties do not match, and FIG. 4 shows a case wherein the task 3 is in a non-secure level, as described above.

The secure operating system 1 manages whether or not the tasks 2 and 3 themselves are secure and the mutual verification keys in the format of a table shown in FIG. 4.

That is to say, the data regarding the tasks 2 in a secure level, the task 3 in a non-secure level, and the data of the keys which the tasks 2 and 3 have is held within the secure operating system 1 in the format of the table shown in FIG. 4.

Figure 3:
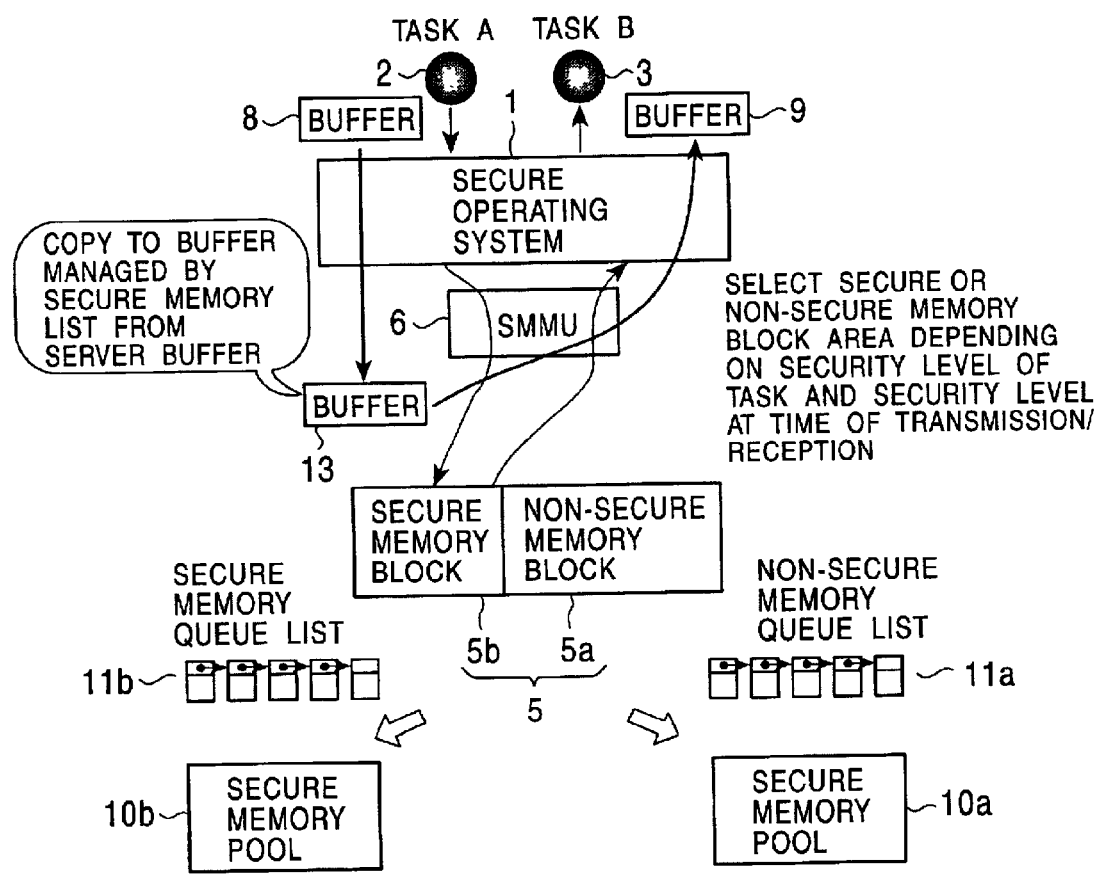
FIG. 3 is an explanatory diagram of the configuration of components in the event of performing inter-task communication, applied to an embodiment of the secure inter-task communication method on an operating system according to the present invention.

Next, description will be made regarding memory block management of the secure operating system 1 with reference to FIG. 3. In this FIG. 3, a memory block 5 such as RAM which is capable of reading and writing is divided into two parts, a non-secure memory block 5a and a secure memory block 5b.

The non-secure memory block 5a has a non-security level such as with task 3 written to addresses of odd numbers, such as No. 1, 3, and so on through n–1, in blocks.

Also, the secure memory block 5b has a non-security level such as with task 2 written to addresses of even numbers, such as No. 2, 4, and so on through n, in blocks.

That is to say, the memory block 5 is read from and written to with an MMU 6 capable of setting security levels for tasks in increments of blocks (memory managing unit, hereafter referred to as SMMU).

The SMMU 6 compares the security level of the side for reading and writing, i.e., the security level of the secure operating system 1 (or in other words, the security level of the task requesting service) with the security level written to the non-secure memory block 5a and the security level written to the secure memory block 5b, and in the event that the security level of the side to perform reading and writing is low, a security access violation exception occurs, and reading and writing from and to the secure memory block 5b and the non-secure memory block 5a is disabled.

In other words, a security access violation exception occurs regarding an attempt to access the secure memory block 5b and the non-secure memory block 5a with a higher security level than the task requiring the service, and reading and writing from and to the secure memory block 5b and the non-secure memory block 5a is disabled.

The SMMU 6 is hardware capable of making "access permitted" and "access denied" settings according to the security level of the memory 5, for each of the secure memory block 5b and the non-secure memory block 5a.

For example, the SMMU 6 in a non-secure level state cannot read from or write to the secure memory block 5b in a secure state.

Figure 5:
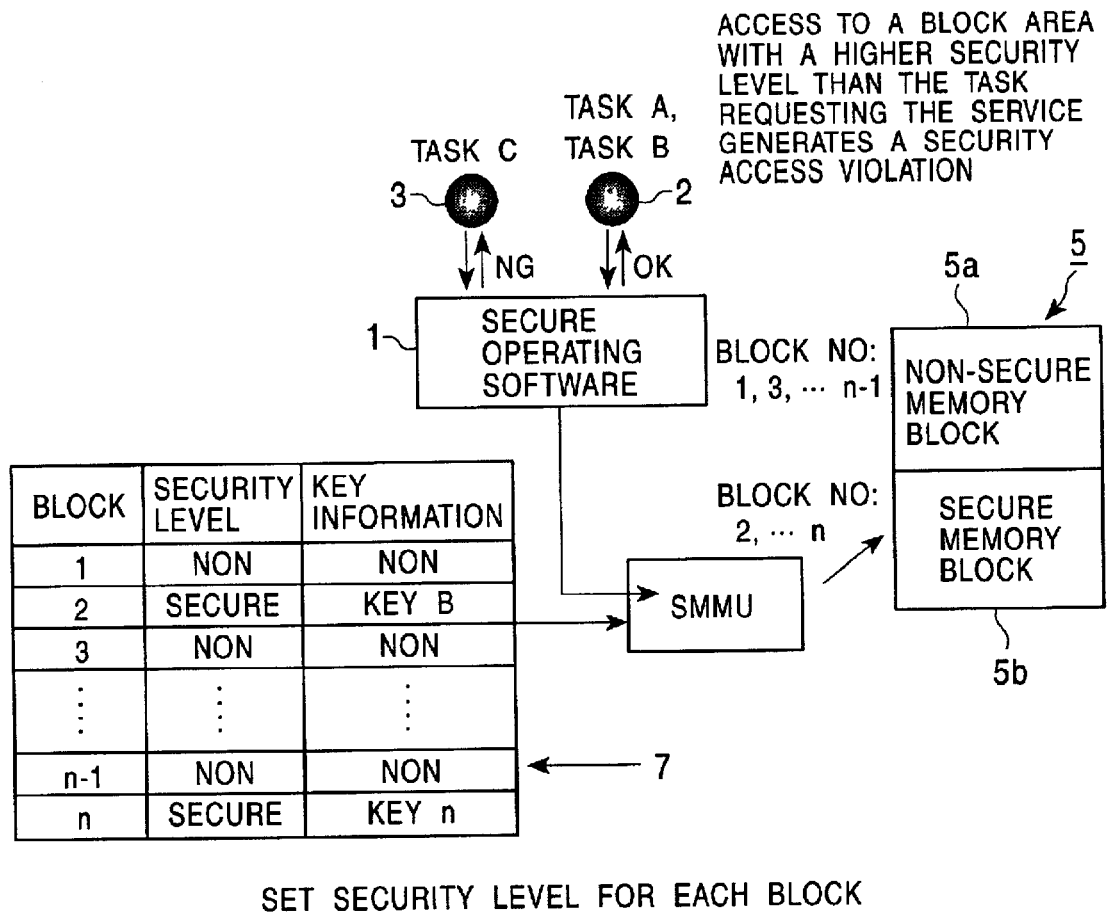
FIG. 5 is an explanatory diagram for describing secure memory block management at a secure operating system side, applied to the first embodiment of the secure inter-task communication method on an operating system according to the present invention.

Setting of the security level for the secure memory block 5b and the non-secure memory block 5a is performed by the SMMU 6 at the time of initializing the secure operating system 1, as shown in the table in FIG. 5.

This table in FIG. 5 correlates data of whether or not there is security for addresses in the secure memory block 5b and the non-secure memory block 5a, and keys.

Also, the secure operating system 1 performs managing of the security level for each task, and management of the secure memory block 5b and the non-secure memory block 5a via the SMMU 6, in a centralized manner.

Next, a case of performing secure inter-task communication will be described with reference to FIG. 3. The inter-task communication in this case is mail, and the task 2 will be described as a mail transmitting task 2 in FIG. 3. Also, the task 3 will be described as a mail transmitting task 3 in FIG. 3.

A mail transmitting buffer 8 (server buffer) is prepared on the mail transmitting task 2, and also a mail receiving buffer 9 is prepared on the mail receiving task 3.

Also, memory area for storing the mail contents within the secure operating system 1 is prepared in the format of secure memory pools 10a and 10b.

Memory area for storing management information (equivalent to the above-described secure memory block 5b and the non-secure memory block 5a) is prepared in the format of a non-secure memory queue list 11a and a secure memory queue list 11b.

Figure 6:
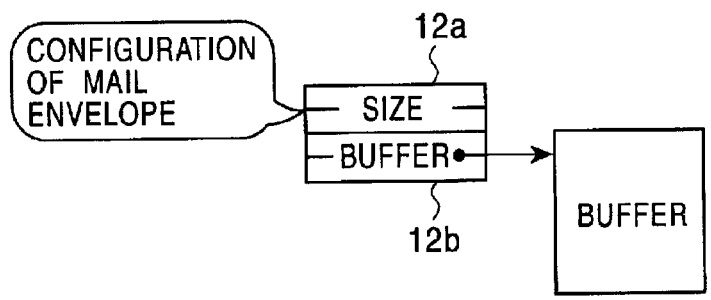
FIG. 6 is a configuration explanatory diagram of mail management information, applied to the embodiment of the secure inter-task communication method on an operating system according to the present invention.

FIG. 6 illustrates the configuration of the management information 12, the management information 12 being configured of mail size 12a and a pointer 12b to the mail body.

The non-secure memory queue list 11a and secure memory queue list 11b, and secure memory pools 10a and 10b are separately prepared in the above-described secure memory block 5b and non-secure memory block 5a.

Next, the flow of processing in the event of transmitting an inter-task communication function (e.g., mail) with the mail transmitting task 2 with a secure level attached, in a case wherein the mail transmitting task 2 and receiving task 3 have completed mutual confirmation with the secure operating system 1 in a normal manner and wherein the security level of the mail transmitting task 2 and receiving task 3 themselves has been set to secure, will be described following the flowchart shown in FIG. 9.

First, the flow starts, and at the mail transmitting task 2, a mail ID and an address to the mail body appropriated at the mail transmitting task are specified, other than the security level.

The mail transmitting task 2 requests a mail transmitting service with the security level on (step S21), and once the mail transmitting task 2 is transmitted and the secure operating system 1 receives the request of the mail transmitting task 2 (or service) (step S22), the secure operating system 1 checks whether or not the received mail transmitting task 2 is in the secure level and is a mail service (step S23).

Next, at the secure operating system 1, judgment is made whether or not the received mail transmitting task 2 and the mail service are at a secure level, and further judgment is made which of the memory blocks of the secure memory block 5b and non-secure memory block 5a to use for the received main transmitting task 2, based on the security level of the transmitting function (shown in FIG. 12A as a mail transmitting function) (step S24).

Only in the event that the results of this judgment show that the received mail transmitting task 2 is on a secure level and the level at the time of transmitting is secure, does to the flow proceed to the processing in step S25, and the secure operating system 1 searches for management information and the mail body in the secure memory queue list 11b managed in the secure memory block 5b by the SMMU 6.

Next, management information is written to one element of mail body, from the searched management information and the mail body.

In this case, the contents of the mail transmitting task 2 is secured from the secure memory pool 10b stored in the secure memory block 5b which has security.

Figure 9:
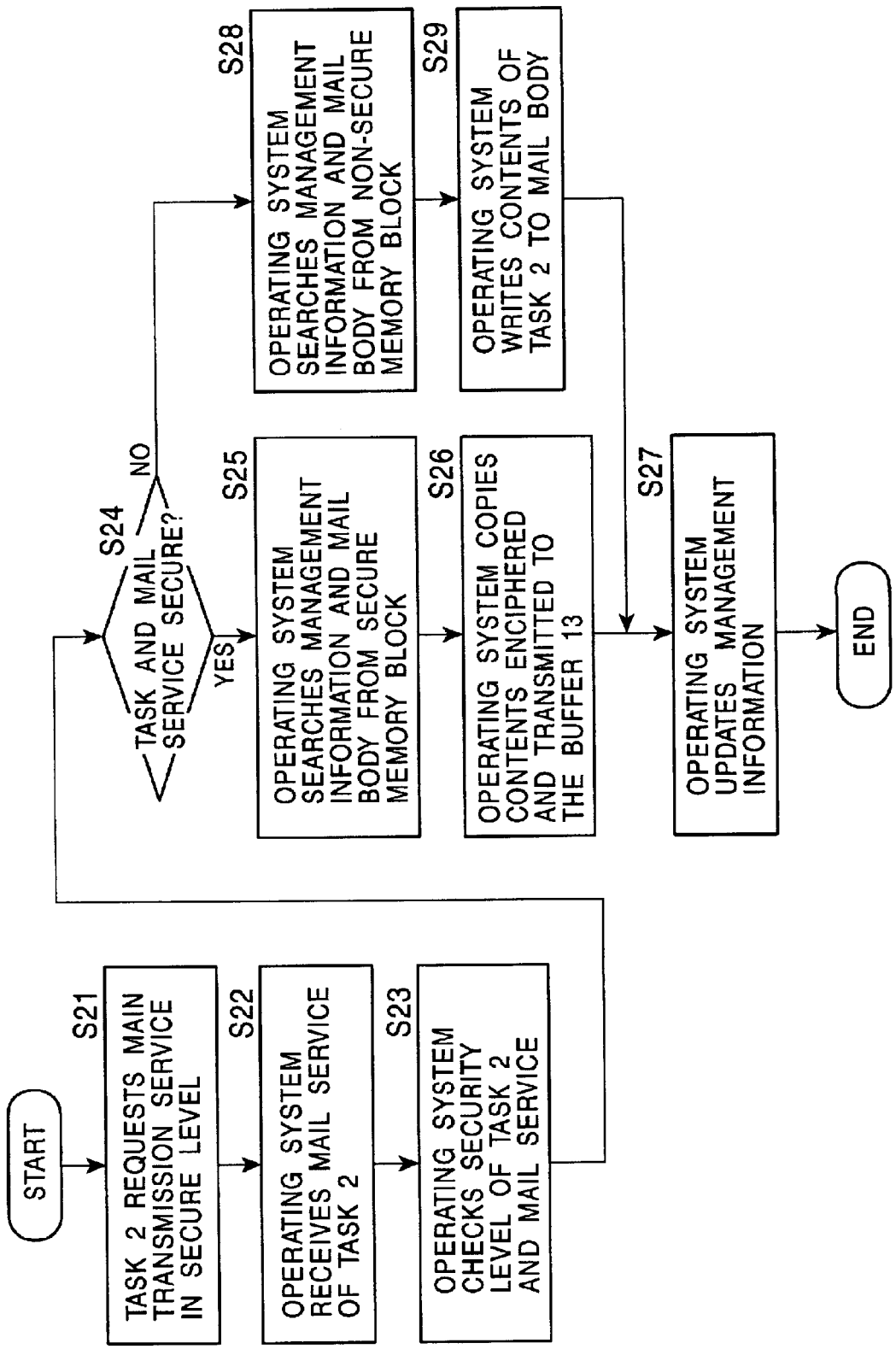
FIG. 9 is a flowchart for describing mail transmitting processing, applied to the embodiment of the secure inter-task communication method on an operating system according to the present invention.

Next, as shown in the flowchart for enciphering the mail body, in FIG. 10, the mail ID is written by the SMMU 6 to the mail body of the mail transmission contents secured from the secure memory pool 10b (step S31), the address value for management information is written (step S32), the address value of the mail body is written and the mail transmission contents are enciphered with these values as a key (step S33), and the enciphered mail transmission contents are copied in step S26 in FIG. 9 from the buffer 8 (server buffer) to the buffer 13 managed by the secure memory queue list 11b.

Next, at the secure operating system 1, the management information is updated (step S27), thereby completing the above series of mail transmitting processing.

Also, in the processing of the above step S24, at the secure operating system 1, in the event that, as a result of the judgement regarding the security of the service of the received mail transmitting task 2 and regarding whether to use the secure memory block 5b or the non-secure memory block 5a for the received mail transmitting task 2 based on the security level of the inter-task communication function, the received mail transmitting task 2 is at a secure level and the level at the time of transmission is not secure, the secure operating system 1 searches the management information and the mail body from the non-secure memory block 5a with the SMMU 6 (step S28).

Next, the secure operating system 1 writes the contents of the mail transmitting task 2 to the mail body, writes to the buffer 8 (step S29), and performs the processing in the above step S27.

Next, the flow for the processing wherein an inter-task communication function (e.g., mail) is received at a level with security with the mail receiving task 3 will be described following the flowchart shown in FIG. 11.

At the mail reception task 3, a mail ID and an address to the mail body appropriated at the mail receiving task 3 are specified, other than the security level. The same value as that at the transmitting is specified for the mail ID.

Next, the mail receiving task 3 requests a mail receiving service with the security level on (step S41), and upon the mail service for the mail receiving task 3 being carried out at the mail receiving task 3, the secure operating system 1 receives the service of the mail receiving task 3 (step S42).

Next, the secure operating system 1 checks whether or not the received mail receiving task 3 and the mail service are at a secure level (step S43), and in the event that the level is secure as a result of the check, next, the secure operating system 1 checks whether or not both the mail receiving task 3 and the service are at a secure level (step S44), and in the event that judgment is made as a result that both are at a secure level, the secure operating system 1 judges which secure memory block to use, based on the security level of the mail receiving task 3 and the security level of the receiving function (shown in FIG. 12B as a mail receiving function).

Only in the event that the results of this judgment show that the received mail receiving task 3 is on a secure level and the level at the time of receiving is secure, is the mail addressed to the mail receiving task 3 within the mail queue list managed by the secure memory block 5b searched for (step S25), and the buffer where the received contents exist is found.

The contents obtained by deciphering the buffer contents with the mail ID, address value of management information, and mail body address value as a key is copied onto the buffer 9 on the mail receiving task 3 (step S46).

Next, the secure operating system 1 returns the mail body and the management information (step S47) and the series of reception processing ends.

Also, in the processing in the above step S44, the secure operating system 1 judges whether or not the mail receiving task 3 and the service are both at a secure level (step S44), and in the event that the judgment results for both is not a secure level, the secure operating system 1 searches the management information in the non-secure memory block 5a (step S48).

Next, the secure operating system 1 copies the mail body onto a buffer 9 prepared on the mail receiving task 3 (step S49), and then performs the processing of the above step S47.

Thus, according to the present embodiment, in the event that the secure operating system judges that the mail transmitting task and the security level of the mail receiving task itself are set to the security mode specified by the task at the time of transmitting and receiving, the secure operating system appropriates to a secure memory block the actual state of the data to be transmitted and management data for establishing inter-task communication paths, enciphers data to be transmitted at the secure operating system using a key, and deciphers data of a mail reception task, so secrecy for inter-task communications having security can be increased by providing a security level to tasks which perform key operation, encryption, and deciphering, with a mechanism wherein access is restricted to contents of inter-task communication under an environment where processing of tasks according to security levels exist together.

Also, the security level can be individually set at the time of activating tasks and inter-task communication services, thereby enabling access restrictions to the content body of inter-task communications by the combination of two specified security levels.

Other Embodiments

Various modifications may be made to the above embodiments, such as a secure inter-task communication method on an operating system which will now be described in brief.

In a first step, tasks executed on an operating system are classified into: a secure level wherein mutual verification between the task and the operating system has succeeded; and a non-secure level wherein mutual verification has not been performed. This classifying is performed based on keys of the tasks themselves. Whether each task itself has security and mutual verification keys for mutual verification with the operating system is managed in a table format at the operating system.

In a second step, blocks of the secure tasks and blocks of the non-secure tasks managed at the operating system are separately written to and read from a secure memory block, and a non-secure memory block with a secure memory managing mechanism.

In a third step, a mail transmitting buffer on is prepared on mail transmitting tasks of the secure tasks and a mail receiving buffer is prepared on mail receiving tasks of the secure tasks. A memory area for storing mail contents and a memory area for storing management information is prepared in the operating system.

In a fourth step, a mail ID and an address, other than security level, are specified with the mail transmitting task to a mail body appropriated at the transmitting task. The operating system judges which memory block to use, based on the security level of the mail transmitting task and the security level of the transmitting function. Only in the event that the mail transmitting task is secure and the level at the time of transmission is secure is management information written to the secure memory block, and the mail transmission contents are written, enciphered with the mail ID, address value of management information, and address value of the mail body, as a key.

In a fifth step, the mail receiving task specifies a mail ID and an address, other than security level, to a mail body appropriated at the mail receiving task, the same as the mail transmitting task. The operating system judges which security memory block to use, based on the security level of the mail receiving task and the security level of the receiving function. Only in the event that the mail receiving task is secure and the level at the time of receiving is secure, is the reception mail addressed to a mail receiving task managed at the security memory block searched and the contents of the buffer wherein the received contents exist are decoded with the mail ID, address value of management information, and address value of the mail body, as the key thereof, and copied to a buffer on the mail reception task.

In this modification, verification can be performed by collating whether or not a key held by each task is the same as the key managed at the secure operating system. The secure memory managing mechanism may comprise hardware capable of setting "access permitted" or "access denied" for each block of the memory blocks according to security level.

The secure memory managing mechanism here can be arranged so as to not be capable of reading from or writing to secure memory blocks with regard to non-secure mail transmitting tasks or mail receiving tasks, and the secure operating system performs management of security levels for each task and management of the memory blocks via the secure memory managing mechanism in a centralized manner.

Also, the management information here may comprise mail size and a mail body pointer, and the actual state of the contents of the mail transmitting task may be secured from a secure memory poll within the secure memory block.

The methods according to the present invention, whether according to the above embodiments, modifications thereof, or any other conceivable arrangements within the spirit and scope of the present invention, may be provided in the form of computer-executable software programs for executing upon computers to carry out the present invention.

The software programs may be provided to general-purpose computer systems capable of executing various types of computer code, in a computer-readable format, via detachable and portable storing media such as, for example, CDs (Compact Disks), FDs (Floppy Disks), MOs (Magneto-Optical disks), or the like. Or, an arrangement wherein computer software is provided to a particular computer system in a computer-readable format via a sending medium such as a network (regardless of whether the network is cable or wireless) is technologically feasible.

In other words, installing the computer software via any such medium onto a computer system yields operational advantages the same as those of the methods according to the present invention.

The present invention has thus been described in detail with reference to specific preferred embodiments and modifications thereof. However, it is needless to say that that those skilled in the art can make modifications and substitutions to the embodiments without departing from the essence of the present invention. That is to say, the present invention has only been disclosed in the form of preferred embodiments given as examples, and accordingly should not be interpreted in a restrictive manner. The scope of the present invention should only be judged by the appended claims.

What is claimed is:

1. A communication method between tasks executed on an operating system, said method comprising:

a step for managing the security level of tasks themselves and mutual verification keys for mutual verification between tasks and said operating system, in a table format at said operating system side, wherein said security level has a first level which is secure and a second level which is not secure;

a step for reading and writing blocks of tasks of said first level and blocks of tasks of said second level separately into a secure memory block and a non-secure memory block, respectively;

a step for providing a first buffer on a first task of a task of said first level, and a second buffer on a second task of a task of said second level, and providing within said operating system memory area for storing data and memory area for storing management information;

a step for specifying at said first task an ID and an address appropriated at said first task side, judging at said operating system side which memory block to use based on the security level of said first task and the security level of a first function, and in the event that the security level of said first task and the level for executing said first task are secure, management information is written to said security memory block and data is written as enciphered contents with the ID, address value of management information, and address value of the data body, as a key; and a step for specifying at said second task an ID the same as said second task and an address appropriated at said second task side, judging at said operating system side which secure memory block to use based on the security level of said second task and the security level of a second function, and, in the event that the security level of said second task and the level for executing said second level are secure data, addressed to said second task managed in said secure memory block is searched, and the contents of the buffer where said data exists is copied onto said second task having been deciphered with the ID, address value of management information, and address value of the data body, as a key.

2. A communication method according to claim 1, wherein said task is any of a semaphore, event flag, or mailbox.

3. A communication method according to claim 1, wherein said task is a semaphore, and said first task is returning of resources and said second task is standing by to capture resources.

4. A communication method according to claim 1, wherein said task is an event flag, and said first task is setting an event flag and said second task is clearing an event flag.

5. A communication method according to claim 1, wherein said task is a mailbox, and said first task is transmitting data and said second task is receiving data.

6. A communication method according to claim 5, wherein said management information comprises mail size and a mail body pointer.

7. A communication method according to claim 1, wherein said verification is performed by collating whether or not a key each task has is the same as the key managed at the operating system side.

8. A communication method according to claim 1, wherein said method is carried out by memory managing means which performs reading and writing discriminatorily between said secure memory block and said non-secure memory block.

9. A communication method according to claim 8, wherein said memory managing means comprise hardware capable of setting access permission for each block of said memory blocks according to security level.

10. A communication method according to claim 9, wherein said memory managing means are not capable of reading from or writing to the memory block of a first level with regard to a first task or a second task in the second level.

11. A communication method according to claim 8, wherein said operating system performs management of security levels for each task and management of said memory blocks via said memory managing means in a centralized manner.

* * * * *